(12) United States Patent
Jin

(10) Patent No.: US 7,331,049 B1
(45) Date of Patent: Feb. 12, 2008

(54) SYSTEM AND METHODOLOGY PROVIDING TYPED EVENT AND NOTIFICATION SERVICES

(75) Inventor: Ke Jin, Foster City, CA (US)

(73) Assignee: Borland Software Corporation, Cupertino, CA (US)

( * ) Notice: Subject to any disclaimer, the term of this patent is extended or adjusted under 35 U.S.C. 154(b) by 832 days.

(21) Appl. No.: 10/605,827

(22) Filed: Oct. 29, 2003

Related U.S. Application Data

(60) Provisional application No. 60/320,128, filed on Apr. 21, 2003.

(51) Int. Cl.
*G06F 3/00* (2006.01)
*G06F 15/16* (2006.01)
*G06F 15/167* (2006.01)

(52) U.S. Cl. ............... 719/314; 709/201; 709/213; 709/231; 719/318

(58) Field of Classification Search ........... 707/1–10; 709/201–207, 213–219, 231; 715/733, 734, 715/746, 749; 719/311–318
See application file for complete search history.

(56) References Cited

U.S. PATENT DOCUMENTS

| | | | | |
|---|---|---|---|---|
| 5,737,607 | A | 4/1998 | Hamilton et al. | 719/316 |
| 5,848,273 | A | 12/1998 | Fontana et al. | 717/108 |
| 5,850,517 | A | 12/1998 | Verkler et al. | 709/202 |
| 5,923,879 | A | 7/1999 | Sasmazel et al. | 717/143 |
| 5,983,233 | A | 11/1999 | Potonniee | 707/103 |
| 6,138,169 | A | 10/2000 | Freund et al. | 719/313 |
| 6,151,639 | A | 11/2000 | Tucker et al. | 709/316 |
| 6,157,941 | A | 12/2000 | Verkler et al. | 709/202 |
| 6,272,554 | B1 | 8/2001 | Chang et al. | 719/313 |
| 6,343,116 | B1 | 1/2002 | Quinton et al. | 379/90.01 |
| 6,347,342 | B1 | 2/2002 | Marcos et al. | 719/315 |
| 6,353,923 | B1 | 3/2002 | Bogle et al. | 717/128 |
| 6,378,004 | B1 | 4/2002 | Galloway et al. | 719/321 |
| 6,438,616 | B1 | 8/2002 | Callsen et al. | 719/316 |
| 6,629,112 | B1 | 9/2003 | Shank et al. | 707/206 |

(Continued)

OTHER PUBLICATIONS

Socolofsky, T. et al., RCF1180: A TCP/IP Tutorial, Spider Systems Limited, Jan. 1991.

(Continued)

*Primary Examiner*—William Thomson
*Assistant Examiner*—Charles E Anya
(74) *Attorney, Agent, or Firm*—John A. Smart; G. Mack Riddle

(57) ABSTRACT

A system and methodology providing typed event and notification services is described. In one embodiment a method for transmitting an event message from a first application to at least one second application over an event channel comprises: generating a message request based on an event at a first application, the message request having a header and a body, the body containing typed event data marshaled for transmission over an event channel; sending the message request to the event channel; in response, reading the header to obtain information about the event without un-marshaling the body; creating a wrapper based, at least in part, on the information obtained from the header; appending the body to the wrapper to create an event message; determining at least one second application to receive the event message; and delivering the event message to the at least one second application.

39 Claims, 5 Drawing Sheets

ORB-LEVEL EVENT/NOTIFICATION CHANNEL IMPLEMENTATION

U.S. PATENT DOCUMENTS

| | | | |
|---|---|---|---|
| 6,671,882 B1 | 12/2003 | Murphy et al. | 725/54 |
| 6,721,747 B2 | 4/2004 | Lipkin | 707/10 |
| 6,737,992 B1 | 5/2004 | Wolthuis | 341/55 |
| 6,745,382 B1 | 6/2004 | Zothner | 717/107 |
| 6,757,899 B2 | 6/2004 | Zhdankin et al. | 719/315 |
| 6,810,487 B2 | 10/2004 | Sawai et al. | 714/4 |
| 6,839,708 B1 | 1/2005 | Boydstun et al. | 707/10 |
| 6,901,596 B1 | 5/2005 | Galloway | 719/330 |
| 6,910,070 B1 | 6/2005 | Mishra et al. | 709/224 |
| 6,961,939 B2* | 11/2005 | Anderson et al. | 719/316 |
| 6,981,265 B1* | 12/2005 | Rees et al. | 719/313 |
| 2001/0054065 A1* | 12/2001 | Garg | 709/203 |
| 2002/0036986 A1* | 3/2002 | Haarsten | 370/235 |
| 2003/0046395 A1* | 3/2003 | Fleming et al. | 709/226 |
| 2004/0193687 A1* | 9/2004 | Christensen et al. | 709/206 |
| 2005/0114355 A1* | 5/2005 | Nuttila | 707/100 |

OTHER PUBLICATIONS

Information Sciences Institute, RFC793: Transmission Control Protocol, Information Sciences Institute, Sep. 1981.

Sun Microsystems, Java 2 Platform Enterprise Edition Specification (Ch 1-4), v. 1.4, Final Release, Sun Microsystems, Inc., Mountain View, CA, Nov. 24, 2003.

Sun Microsystems, Enterprise Java Beans Specification (Ch 1-4), Version 2.1, Final Release, Sun Microsystems, Sun Microsystems, Inc., Mountain View, CA, Nov. 12, 2003.

Gosling, J. et al., The Java Language Environment: A White Paper, Sun Microsystems Computer Company, Oct. 1995.

OMG, OMG, Event Service Specification, Ver. 1.2 Oct. 2004.

OMG, Common Object Request Broker Architecture: Core Specification (Chapters 1, 2, 4, 7, 8, 9, 10, 11, 12, and 14-24), Version 3.0.2 Editorial update, Dec. 2002.

* cited by examiner (PRIOR ART) USER-LEVEL EVENT/NOTIFICATION CHANNEL IMPLEMENTATION

SYSTEM AND METHODOLOGY PROVIDING TYPED EVENT AND NOTIFICATION SERVICES

CROSS REFERENCE TO RELATED APPLICATIONS

The present application is related to and claims the benefit of priority of the following commonly-owned, provisional application(s): application Ser. No. 60/320,128, filed Apr. 21, 2003, entitled "System and Methodology Providing Typed Event and Notification Services", of which the present application is a non-provisional application thereof. The disclosure of the foregoing application is hereby incorporated by reference in its entirety, including any appendices or attachments thereof, for all purposes.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

Computer Program Listing Appendix under Sec. 1.52(e): This application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application.

Object Description: SourceCode.txt, created: Sep. 30, 2003, 11:31 am, size: 5.64 KB; Object ID: File No. 1; Object Contents: Source Code.

BACKGROUND OF INVENTION

1. Field of the Invention

The present invention relates generally to the field of distributed computing with particular emphasis on a system and methodology providing typed event and notification services.

2. Description of the Background Art

Distributed computing is a type of computing in which different components and objects comprising an application can be located on different computers connected to a network. With the explosive growth of the Internet, distributed computing has become increasingly popular in order to simplify network programming and to realize a component-based software architecture. To support distributed computing, an object framework or model is defined, thereby specifying a set of standards about how objects communicate with one another.

Distributed applications must often employ specialized architectures and use specialized communication protocols, such as RPC (Remote Procedure Call), CORBA (Common Object Request Broker Architecture), and DCOM (Microsoft Distributed Component Object Model), to enable program components or objects to communicate with one another regardless of what programming language they are written in or what operating system they are running on. For example, CORBA is an architecture and infrastructure developed by the Object Management Group (OMG) that developers may use to create computer applications that work together over networks. For further description of CORBA, see e.g., "Common Object Request Broker Architecture Core Specification, Version 3.0" (December 2002), available from the OMG, the disclosure of which is hereby incorporated by reference.

Central to the CORBA architecture is the "Object Request Broker" (ORB) that acts as an "object bus" over which objects transparently interact with other objects located locally or remotely. A CORBA object is represented to the outside world by a defined interface with a set of methods. A particular instance of an object is identified by an object reference. The client of a CORBA object acquires a corresponding object reference for use as a handle to make method calls, as if the object were located in the client's own address space. The ORB is responsible for all the mechanisms required to find the object's implementation, prepare it to receive the request, communicate the request to it, and carry the response or reply (if any) back to the client. The object implementation interacts with the ORB through either an Object Adapter (OA) or through the ORB interface. In this manner, CORBA enables pieces of programs (i.e., components or objects) to communicate with one another regardless of what programming language they were written in or what operating system they are running on. A CORBA-based program from one vendor can interact with a CORBA-based program from the same or another vendor, on a wide variety of computers, operating systems, programming languages, and networks.

The CORBA framework provides client-server type of communications. To request a service, a client invokes a method implemented by a remote object, which acts as the server in the client-server model. The service provided by the server is encapsulated as an object and the interface of an object is described in an Interface Definition Language (IDL). The interfaces defined in an IDL file serve as a contract between a server and its clients. Clients interact with a server by invoking methods described in the IDL. The actual object implementation is hidden from the clients.

CORBA is widely used to implement distributed applications and web services. It enables interactions between a client process and an object server to be implemented as object-oriented RPC-style communications. However, application developers and users are faced with a number of challenges in developing, implementing, and supporting a distributed application employing these specialized architectures and communication mechanisms.

In the CORBA architecture, the core object request broker (ORB) is an object-oriented distributed platform primarily for traditional client/server applications. This platform supports a connection oriented, synchronous communication model. Other communication models are usually supported on the so-called Common Object Service (COS) level. For example, a standard CORBA request results in the synchronous execution of an operation by an object. If the operation defines parameters or return values, data is communicated between the client and the server. A request is directed to a particular object. For the request to be successful, both the client and the server must be available. If a request fails because the server is unavailable, the client receives an exception and must take some appropriate action.

The OMG Event Service decouples the communication between objects and supports the asynchronous exchange of event messages. The OMG Event Service introduces event channels which broker event messages, and defines two roles for objects: the supplier role and the consumer role. Suppliers produce event data and consumers process event data. Event data is communicated between suppliers and consumers by issuing standard CORBA requests. For further description of the OMG Event Service, see e.g., "Event Service Specification, New Edition: Version 1.0" (June 2000), available from the OMG, the disclosure of which is hereby incorporated by reference.

More recently, the OMG Event Service was extended and enhanced by the OMG Notification Service, which introduces the concepts of filtering and configurability according to various quality of service (QoS) requirements. For further description of the OMG Notification Service, see e.g., "Notification Service Specification, Version 1.0.1" (August 2002), available from the OMG, the disclosure of which is hereby incorporated by reference. Clients of the Notification Service can subscribe to specific events of interest by associating filter objects with the proxies through which the clients communicate with event channels. These filter objects encapsulate constraints which specify the events the consumer is interested in receiving, enabling the channel to only deliver events to consumers that have expressed interest in receiving them. Together, the Event Service and the Notification Service (hereinafter referred to together as the "Event and Notification Service") address the following requirements which are not supported at the core ORB level: a distributed publish/subscribe, many-to-many communication model; unidirectional, de-coupled asynchronous event distribution; quality of service (QoS) requirements such as event/connection persistence; and event filtering.

These requirements have been addressed in traditional message oriented middleware (MOM) long before OMG's Event and Notification Service. Nevertheless, the OMG solution is based upon open standards, language independent, and interoperable within a CORBA environment. OMG's Event and Notification Service specifications define four kinds of event channels: untyped, structured, sequence, and typed. Implementing untyped, structured, and sequence channels is relatively simple and these three channels are supported by a number of commercial or open source products. However, event transfer interfaces of these three channels (i.e., untyped, structured, and sequence) are infrastructure-defined rather than user-defined (i.e., defined by an infrastructure instead of by users). Therefore, these channels usually require more application level dynamic manual code to perform event packing and unpacking operations (e.g., into CORBA "Any" or "Anys"). This may result in a number of problems including increased user code complexity, larger event size (in-band type codes), performance overhead (dynamic code and dynamic memory allocation), and so forth.

On the other hand, the use of a typed channel can avoid many of the above problems for both the supplier and consumer sides of distributed applications. However, implementing a typed event and notification channel has long been acknowledged as technically challenging. Existing typed channel implementations are based on the idea of routing typed events using an Interface Definitional Language (IDL) interface knowledgeable decoder and encoder to dynamically de-marshal and re-marshal messages as described in the OMG Event Service specification. In current implementations, encoders/decoders are typically implemented using DII (Dynamic Invocation Interface), DSI (Dynamic Skeleton Interface), IR (Interface Repository), or DynAny (Dynamic Any Interface) technologies. The resulting typed channel implementations are very inefficient (i.e., have performance issues) and are also subject to a number of restrictions and limitations (e.g., current implementations cannot handle events which contain valuetypes). Therefore, although typed events have much smaller event sizes and are more elegant and efficient for supplier and consumer applications, only limited support for typed event and notification channels is provided in current products.

What is required is a solution which simplifies the implementation of an efficient typed channel. The solution should have a substantially reduced performance overhead compared to current typed channel implementations. The solution should also remove the restrictions which hamper current typed channel implementations. For instance, the solution should support valuetypes and remote method invocation (e.g., over the Internet Inter-ORB Protocol). The present invention provides a solution for these and other needs.

SUMMARY OF INVENTION

A system and methodology providing typed event and notification services is described. In a first embodiment, a method of the present invention is described for transmitting an event message from a first application to at least one second application over an event channel, the method comprises steps of: generating a message request based on an event at a first application, the message request having a header and a body, the body containing typed event data marshaled for transmission over an event channel; sending the message request to the event channel; in response, reading the header to obtain information about the event without un-marshaling the body; creating a wrapper based, at least in part, on the information obtained from the header; appending the body to the wrapper to create an event message; determining at least one second application to receive the event message; and delivering the event message to the at least one second application.

In a second embodiment, a method of the present invention is described for delivering a message based on an event at a supplier object to a consumer object through a communication channel, the method comprises steps of: receiving at a communication channel a request from a supplier object based on an event, the request including a request header and a payload, the payload comprising typed event data based on the event marshaled for delivery through the communication channel; identifying a consumer object to receive a message based on the request; generating a message header based, at least in part, on the request header; creating a message for delivery to the consumer object by appending the payload to the message header, the message created without un-marshalling the payload; determining if the payload of the message is properly aligned; and if the payload of the message is determined to be properly aligned, delivering the message to the consumer object.

In a third embodiment, a system of the present invention is described for sending an event message from a supplier program to a consumer program, the system comprises: a supplier object request broker for receiving notice of an event at a supplier program, creating a message request based on the event, and transmitting the message request to an event channel, the message request including a header and a body containing typed event data marshaled for transmission through the event channel; an event channel for receiving the message request, reading the header to obtain information about the event, creating a wrapper based on the information from the header, appending the body to the wrapper to create a message without un-marshalling the body, determining a consumer program to receive the message, and delivering the message to a consumer object request broker associated with the consumer program; and a consumer object request broker for receiving the message from the event channel, un-marshaling the body of the message to obtain the typed event data, and providing the typed event data to the consumer program.

DETAILED DESCRIPTION

Glossary

Figure 1:
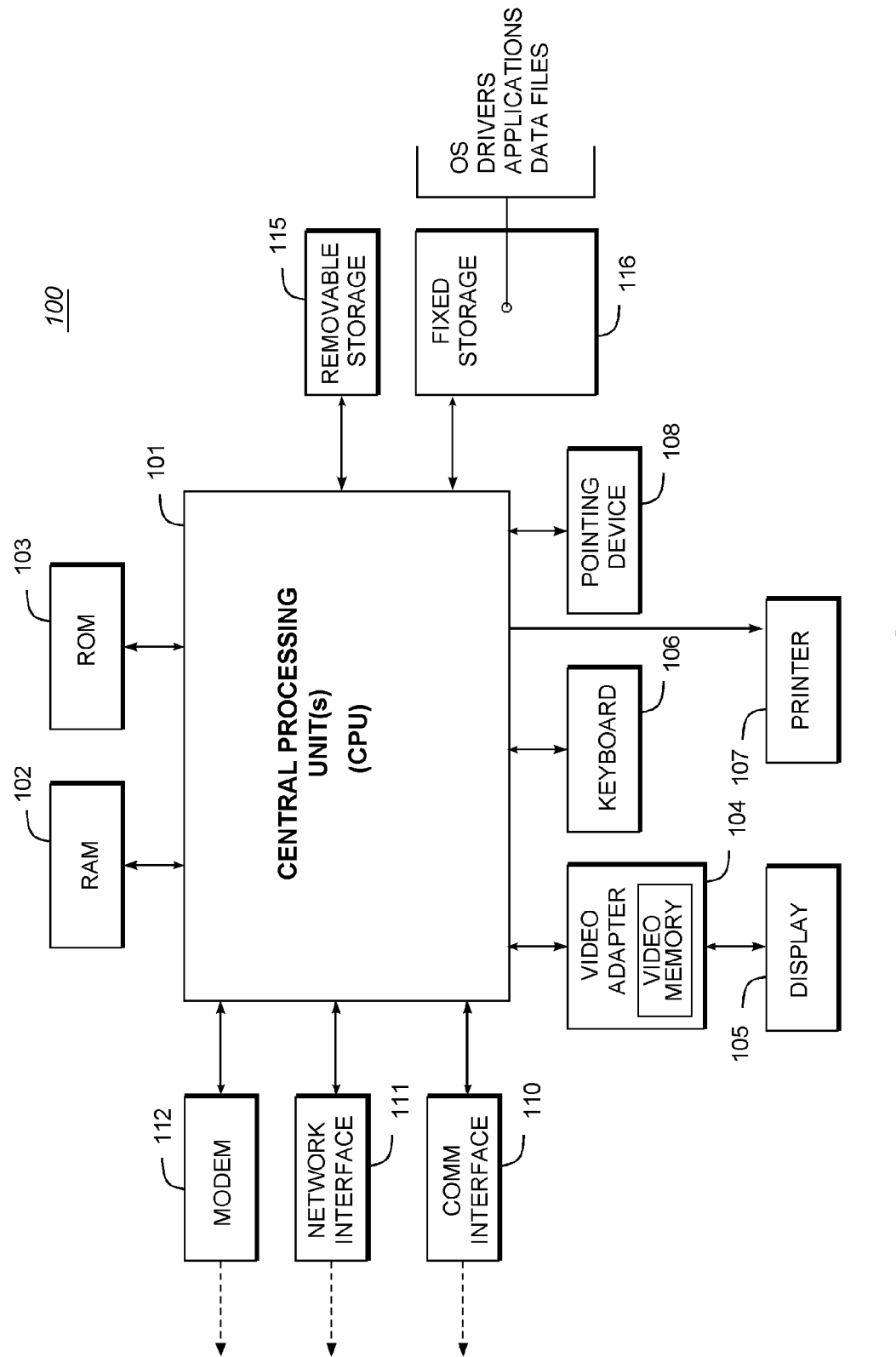
FIG. 1 is a block diagram of a computer system in which software-implemented processes of the present invention may be embodied.

The following definitions are offered for purposes of illustration, not limitation, in order to assist with understanding the discussion that follows.

CORBA: "CORBA" refers to the Object Management Group (OMG) Common Object Request Broker Architecture which enables program components or objects to communicate with one another regardless of what programming language they are written in or what operating system they are running on. CORBA is an architecture and infrastructure that developers may use to create computer applications that work together over networks. A CORBA-based program from one vendor can interoperate with a CORBA-based program from the same or another vendor, on a wide variety of computers, operating systems, programming languages, and networks. For further description of CORBA, see e.g., "Common Object Request Broker Architecture: Core Specification, Version 3.0" (December 2002), available from the OMG, the disclosure of which is hereby incorporated by reference.

EJB: "EJB" refers to Enterprise Java Beans, a Java API developed by Sun Microsystems that defines a component architecture for multi-tier client/server systems. For further information on Enterprise Java Beans, see e.g., "Enterprise JavaBeans Specification, version 2.1" available from Sun Microsystems, the disclosure of which is hereby incorporated by reference. A copy of this specification is currently available via the Internet (e.g., at java.sun.com/products/ejb/javadoc-2_1-pdf).

Event: An "event" carries information about an operation that has been (or is being) performed at an object. The information or "event data" about the operation may include the object name (called an object reference) and one or more parameters. When an object is changed (i.e., its state is modified), an event can be generated that is propagated to all interested parties. For example, when a spreadsheet cell object is modified, a second object which contains a reference to that spreadsheet cell can be notified (for example, to recalculate values that depend on the cell). In this scenario, the spreadsheet object that is changed acts as an event supplier, while the second object receiving notification of the event acts as a consumer of the event data. Events (or event data) can be either generic or typed. In the case of "generic events", a single parameter packages all the event data. In the case of "typed events", event data is passed by means of the parameters defined in an interface, which is defined using the Object Management Group (OMG) Interface Definition Language (IDL). A generic event has a single parameter of the datatype "any", whereas a typed event may have an arbitrary number of typed data parameters which can be of any IDL datatype.

Event channel: In this document the terms "event channel" and "event/notification channel" refer broadly to a service that decouples the communication between suppliers and consumers of event data. An event channel typically provides for asynchronous communication of event data between suppliers and consumers. Although consumers and suppliers communicate with an event channel using standard CORBA requests, the event channel does not need to supply the event data to its consumer at the same time it consumes the data from its supplier. The event channel is itself both a consumer and a supplier of the event data.

Event Service: "Event Service" refers to the OMG Event Service which decouples the communication between objects and supports the asynchronous exchange of event messages. The OMG Event Service introduces event channels which broker event messages, and defines two roles for objects: the supplier role and the consumer role. Suppliers produce event data and consumers process event data. Event data is communicated between suppliers and consumers by issuing standard CORBA requests. For further description of the OMG Event Service, see e.g., "Event Service Specification, New Edition: Version 1.0" (June 2000), available from the OMG, the disclosure of which is hereby incorporated by reference.

Event and Notification Service: In this document the term "Event and Notification Service" refers to the OMG Event Service as enhanced and extended by the OMG Notification Service.

GIOP: "GIOP" refers to the General Inter-ORB Protocol which specifies formats for messages to be exchanged by inter-operating CORBA Object Request Brokers (ORBs). The GIOP defines the format of IDL data "on the wire" and makes general assumptions about the quality of service (QoS) characteristics of the transport layer underpinning it. For further description of GIOP, see e.g., "Common Object Request Broker Architecture: Core Specification, Version 3.0, Chapter 15, General Inter-ORB Protocol" (December 2002), available from the OMG, the disclosure of which is hereby incorporated by reference.

GIOP message: A "GIOP message" is message (e.g., a GIOP Request Message) that encodes a CORBA object invocation for delivery over an event channel. A GIOP Request Message has three elements: a GIOP message header, a Request Header, and a Request Body (or payload). In GIOP versions 1.0 and 1.1, the Request Body (or payload) is marshaled into the Common Data Representation (CDR) definition encapsulation of the containing message immediately following the Request Header. In GIOP versions 1.2 and 1.3, the Request Body (or payload) is always aligned on an 8-octet boundary.

IIOP: "IIOP" refers to the Internet Inter-ORB Protocol which defines the mapping of GIOP message transfer to TCP/IP connections. The IIOP provides for the underlying transport layer to be TCP/IP and defines the structure of an interoperable object reference (IOR) to consist of, among other things, a TCP/IP endpoint address and an opaque object key to identify a target object within the address space identified by the TCP/IP endpoint. For further description of IIOP, see e.g., "Common Object Request Broker Architecture: Core Specification, Version 3.0, Chapter 15, General Inter-ORB Protocol" (December 2002), available from the OMG, the disclosure of which is hereby incorporated by reference.

Java: "Java" is a general purpose programming language developed by Sun Microsystems. Java is an object-oriented language similar to C++, but simplified to eliminate language features that cause common programming errors. Java source code files (files with a .java extension) are compiled into a format called bytecode (files with a .class extension), which can then be executed by a Java interpreter. Compiled Java code can run on most computers because Java interpreters and runtime environments, known as Java virtual machines (VMs), exist for most operating systems, including UNIX, the Macintosh OS, and Windows. Bytecode can also be converted directly into machine language instructions by a just-in-time (JIT) compiler. Further description of the Java Language environment can be found in the technical, trade, and patent literature; see e.g., Gosling, J. et al., "The Java Language Environment: A White Paper," Sun Microsystems Computer Company, October 1995, the disclosure of which is hereby incorporated by reference. For additional information on the Java programming language (e.g., version 2), see e.g., "Java 2 SDK, Standard Edition Documentation, version 1.4.1", from Sun Microsystems, the disclosure of which is hereby incorporated by reference. A copy of this documentation is currently available via the Internet (e.g., at java.sun.com/j2se/1.4.1/docs/index.html).

J2EE: "J2EE" is an abbreviation for Java 2 Platform Enterprise Edition, which is a platform-independent, Java-centric environment from Sun Microsystems for developing, building and deploying Web-based enterprise applications. The J2EE platform consists of a set of services, APIs, and protocols that provide functionality for developing multi-tiered, web-based applications. For further information on J2EE, see e.g., "Java 2 Platform, Enterprise Edition Specification, version 1.4", from Sun Microsystems, Inc., the disclosure of which is hereby incorporated by reference. A copy of this specification is currently available via the Internet (e.g., at java.sun.com/j2ee/docs.html).

Marshaling: "Marshaling" refers to process of encoding event operations and parameters into a standard format for transmission. Sending event data from a first object to a second (or receiving) object across different address spaces requires both marshaling and un-marshaling. Marshaling packs a method call's parameters (at the first object's space) into a flattened message format for transmission. Un-marshaling is the reverse operation which unpacks the flattened message format into an appropriate data presentation in the address space of the receiving (second) object.

Notification Service: "Notification Service" refers to the OMG Notification Service which extends and enhances the OMG Event Service by introducing the concepts of filtering and configurability according to various quality of service requirements. Clients of the Notification Service can subscribe to specific events of interest by associating filter objects with the proxies through which the clients communicate with event channels. These filter objects encapsulate constraints which specify the events the consumer is interested in receiving, enabling the channel to only deliver events to consumers that have expressed interest in receiving them. For further description of the OMG Notification Service, see e.g., "Notification Service Specification Version 1.0.1" (August 2002), available from the OMG, the disclosure of which is hereby incorporated by reference.

TCP: TCP stands for Transmission Control Protocol. TCP is one of the main protocols in TCP/IP networks. Whereas the IP protocol deals only with packets, TCP enables two hosts to establish a connection and exchange streams of data. TCP guarantees delivery of data and also guarantees that packets will be delivered in the same order in which they were sent. For an introduction to TCP, see e.g., "RFC 793: Transmission Control Protocol", the disclosure of which is hereby incorporated by reference. A copy of RFC 793 is currently available via the Internet (e.g., at www.ietf.org/rfc/rfc793.txt).

TCP/IP: TCP/IP stands for Transmission Control Protocol/Internet Protocol, the suite of communications protocols used to connect hosts on the Internet. TCP/IP uses several protocols, the two main ones being TCP and IP. TCP/IP is built into the UNIX operating system and is used by the Internet, making it the de facto standard for transmitting data over networks. For an introduction to TCP/IP, see e.g., "RFC 1180: A TCP/IP Tutorial", the disclosure of which is hereby incorporated by reference. A copy of RFC 1180 is currently available via the Internet (e.g., at www.ietf.org/rfc/rfc1180.txt).

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, BeOS, Solaris, UNIX, NextStep, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Computer-Based Implementation

Basic System Hardware (e.g., for Desktop and Server Computers)

The present invention may be implemented on a conventional or general-purpose computer system, such as an IBM-compatible personal computer (PC) or server computer. FIG. 1 is a very general block diagram of an IBM-compatible system 100. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP LaserJet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

Basic System Software

Figure 2:
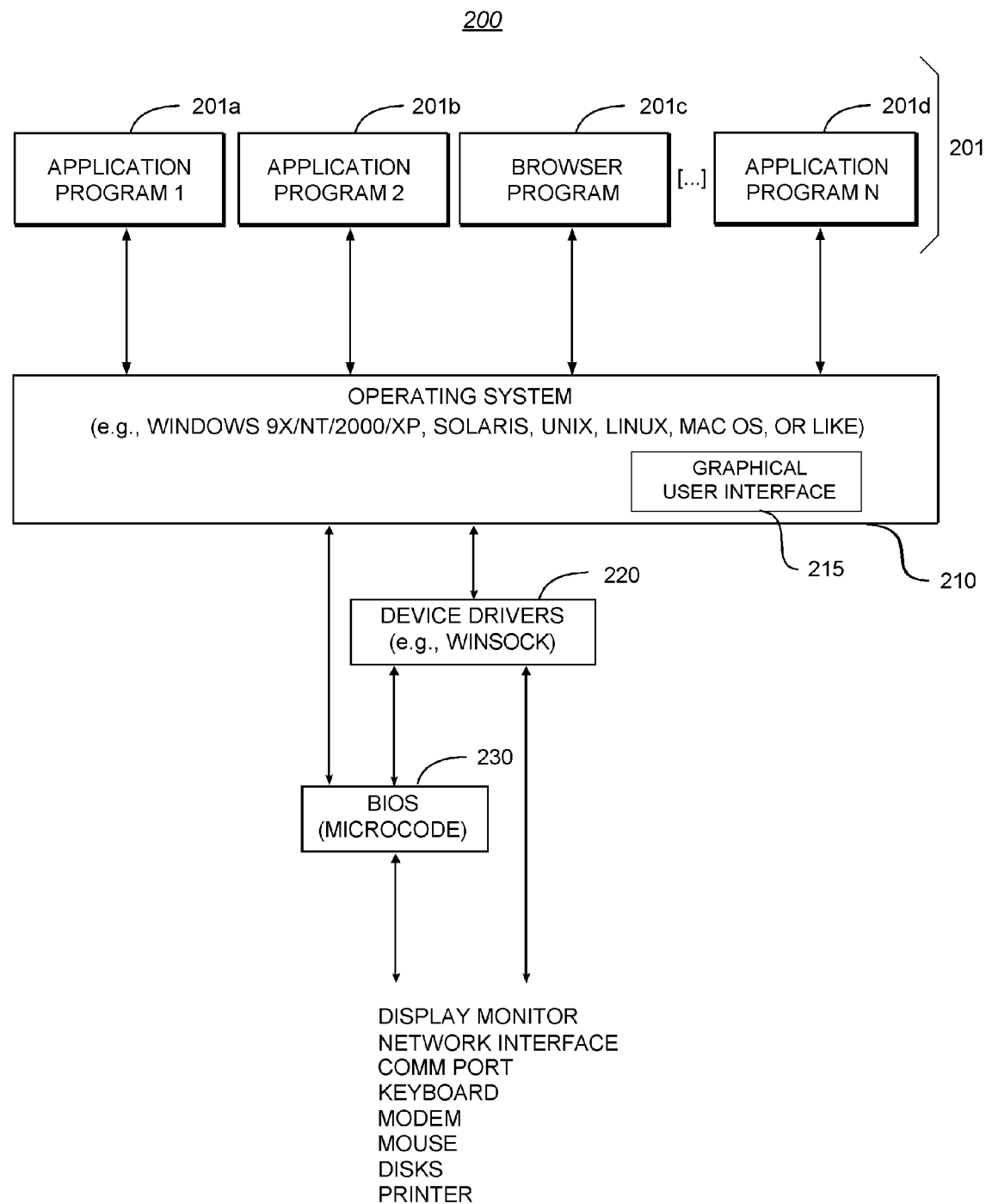
FIG. 2 is a block diagram of a software system for controlling the operation of the computer system.

Illustrated in FIG. 2, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100. The applications or other software intended for use on the computer system 100 may also be stored as a set of downloadable computer-executable instructions, for example, for downloading and installation from an Internet location (e.g., Web server).

Software system 200 includes a graphical user interface (GUI) 215, for receiving user commands and data in a graphical (e.g., "point-and-click") fashion. These inputs, in turn, may be acted upon by the system 100 in accordance with instructions from the operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft Windows 9x, Microsoft Windows NT, Microsoft Windows 2000, or Microsoft Windows XP, all available from Microsoft Corporation of Redmond, Wash. Alternatively, OS 210 can also be an alternative operating system, such as the previously mentioned operating systems.

The above-described computer hardware and software are presented for purposes of illustrating the basic underlying desktop and server computer components that may be employed for implementing the present invention. For purposes of discussion, the following description will present examples in which it will be assumed that there exists a "server" (e.g., Web server) that communicates with one or more "clients" (e.g., desktop computers). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Overview and System Components

Event and Notification Service

As described above, CORBA is a frequently used architecture and infrastructure that enables computer applications to work together over networks. CORBA applications are composed of objects, individual units of running software that combine functionality and data. Typically, there are many instances of an object of a single type. For example, an e-commerce website may have many shopping cart object instances, all identical in functionality but differing in that each is assigned to a different customer, and contains data representing the merchandise that a particular customer has selected.

For each object type an interface is defined. Any client that wants to invoke an operation on the object must use this interface to specify the operation the client wants to perform, and to marshal (or encode) the arguments that it sends. When the invocation reaches the target object, the same interface definition is used at the target to un-marshal (or decode) the arguments so that the target object can perform the requested operation with the arguments. The interface definition is then used to marshal the results for their trip back to the client, and to un-marshal them when they reach their destination.

Figure 3:
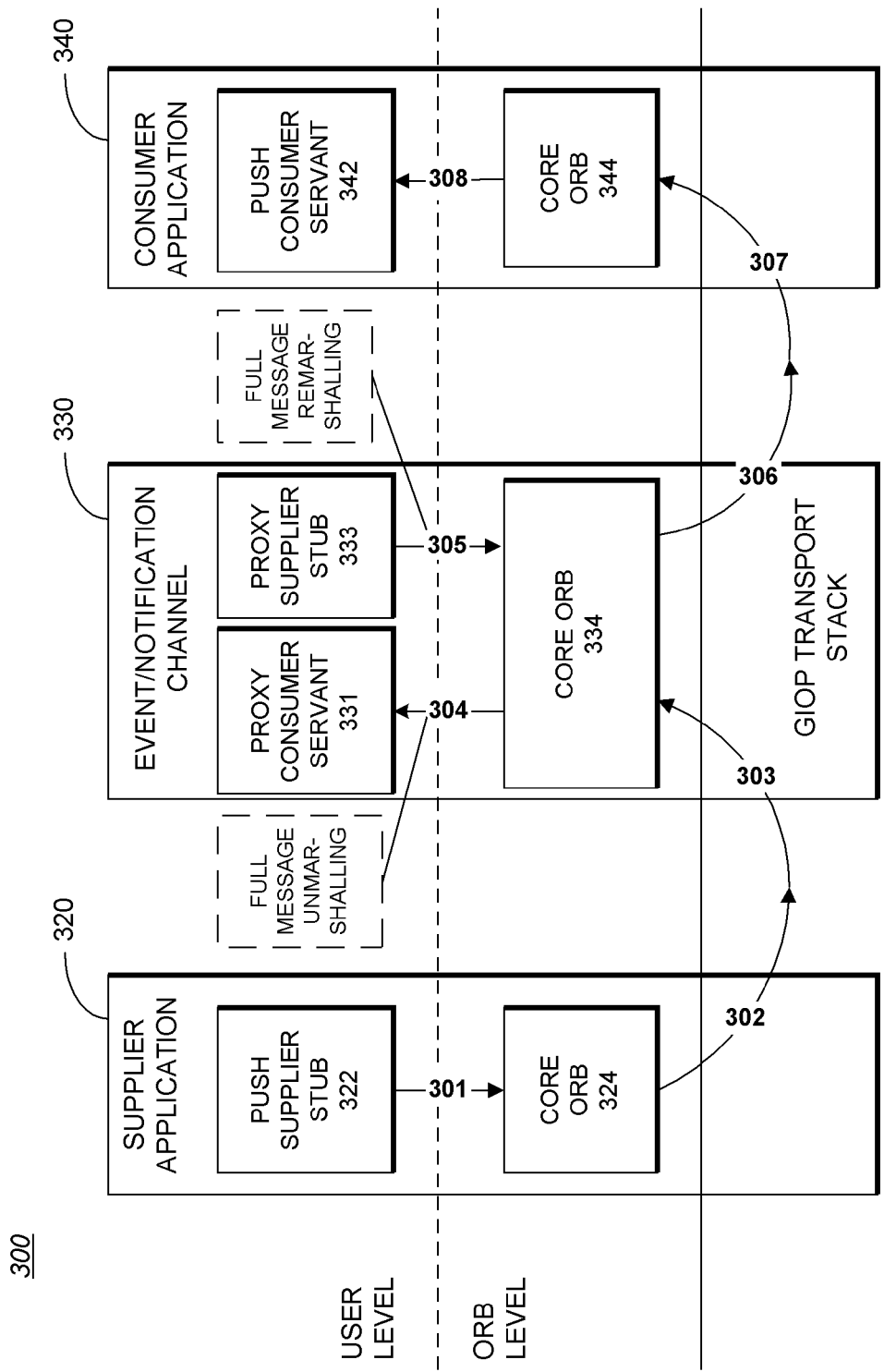
FIG. 3 illustrates a traditional user-level event/notification channel implementation which uses application-level delegating.

For a client to invoke an object remotely, a client-side object request broker (ORB) is typically used to route the invocation of the remote object over the network to the remote object's ORB. As described above, the OMG Event and Notification Service decouples the communication between "supplier" objects which produce event data and "consumer" objects which process event data. As illustrated at FIG. 3, events are communicated between suppliers and consumers through an OMG event (or event/notification) channel. The event channel can be considered as a communication channel for transmitting event messages between supplier objects and consumer objects. One can think of this as being analogous to the delivery of printed publications to subscribers. A supplier is a publisher that produces publications (e.g., newspapers, magazines, or the like). A number of different suppliers may publish a wide range of publications. Various consumers may, in turn, subscribe to receive one or more of the publications produced by the suppliers. An event channel service serves as the middleman maintaining the subscription lists and delivering the publications to consumers that have expressed interest in receiving them (i.e., subscribers). Before describing the system and methodology of the present invention, a traditional user-level event channel implementation will be described.

Traditional User-Level Implementation

The OMG Event Service was initially published in 1994 and the OMG Notification Service was initially published in 1999. Since the initial publication of these services, they have been implemented by many software vendors, education/research groups, and industry users. Practically all of these implementations are based on a common conventional design. Specifically, they are all implemented outside the core Object Request Broker (ORB) at the user level.

FIG. 3 illustrates a traditional user-level event/notification channel implementation 300 which uses user-level (or application level) delegating. As shown, a supplier application 320 pushes an event to a consumer application 340 using an event (event/notification) channel 330. In a user-level implementation, as shown at FIG. 3, the OMG event/notification channel 330 is an ordinary server as well as a client application. The event channel 330 accommodates proxy consumers as server objects and holds references of connected consumers. An end-to-end event transfer includes two separate client/server remote procedure call (RPC) invocations. First, a push supplier stub 322 of a supplier application 320 sends events to the channel by invoking requests on the channel's user-level proxy consumer servant 331 (depicted at 301, 302, 303, 304 at FIG. 3) through the core ORB 324, 334.

In traditional user-level implementations, the event channel (or service) 330 typically un-marshals the entire message at 304 (i.e., at the proxy consumer servant 331). Significantly, current event/notification channel implementations generally require the channel to read and understand the entire message in order to deliver it to the consumers.

After un-marshaling (decoding) the message, the event/notification channel 330 then replicates these events to the consumers (e.g., consumer application 340) by invoking the same requests on their references. As shown at FIG. 3, the proxy supplier stub 333 re-marshals (encodes) the message as shown at 305, makes a copy of the message for each subscriber (i.e., registered consumer) and then sends the messages to the consumer(s). As depicted at 305, 306, 307, 308 at FIG. 3, the message is sent by the proxy supplier stub 333 to a push consumer servant 342 of a consumer application 340 through the core ORB 334, 344.

Although current user-level event/notification channel implementations are relatively easy to build and are portable, they have a number of limitations, including the following: poor performance and scalability; weak and intricate typed channel support; lack of value type support (i.e., they are valuetype impenetrable); and incompatibility with Java 2 Enterprise Edition (J2EE). These limitations and weaknesses of current user-level event/notification channel implementations are described in more detail below. Generally, vendors attempt to compensate for these major weaknesses by providing a number of other minor features. The resulting conglomeration is not only weak but also highly restrictive and unnecessarily complex.

As a result of these limitations, a typical user-level vendor implementation (e.g., a packaged software product) may comply with the OMG specification, but usually does not meet user performance expectations. In many cases, therefore, an ad hoc solution (i.e., user developed application) is used instead of a packaged product. These ad hoc solutions are also typically implemented at the user level but are generally not OMG compliant. These solutions frequently use application specific static typed event interfaces instead of DII/DSI/IR or a few pre-defined non-typed event formats. Therefore, these ad hoc solutions usually have better performance, scalability, type safety, and valuetype support than standard (i.e., packaged) user-level solutions. Also, as application specific solutions, they are semantically closer to the applications they are supporting than standard user-level based solutions and, therefore, typically have somewhat more simple and clean architectures.

ORB-Level Implementation

Figure 4:
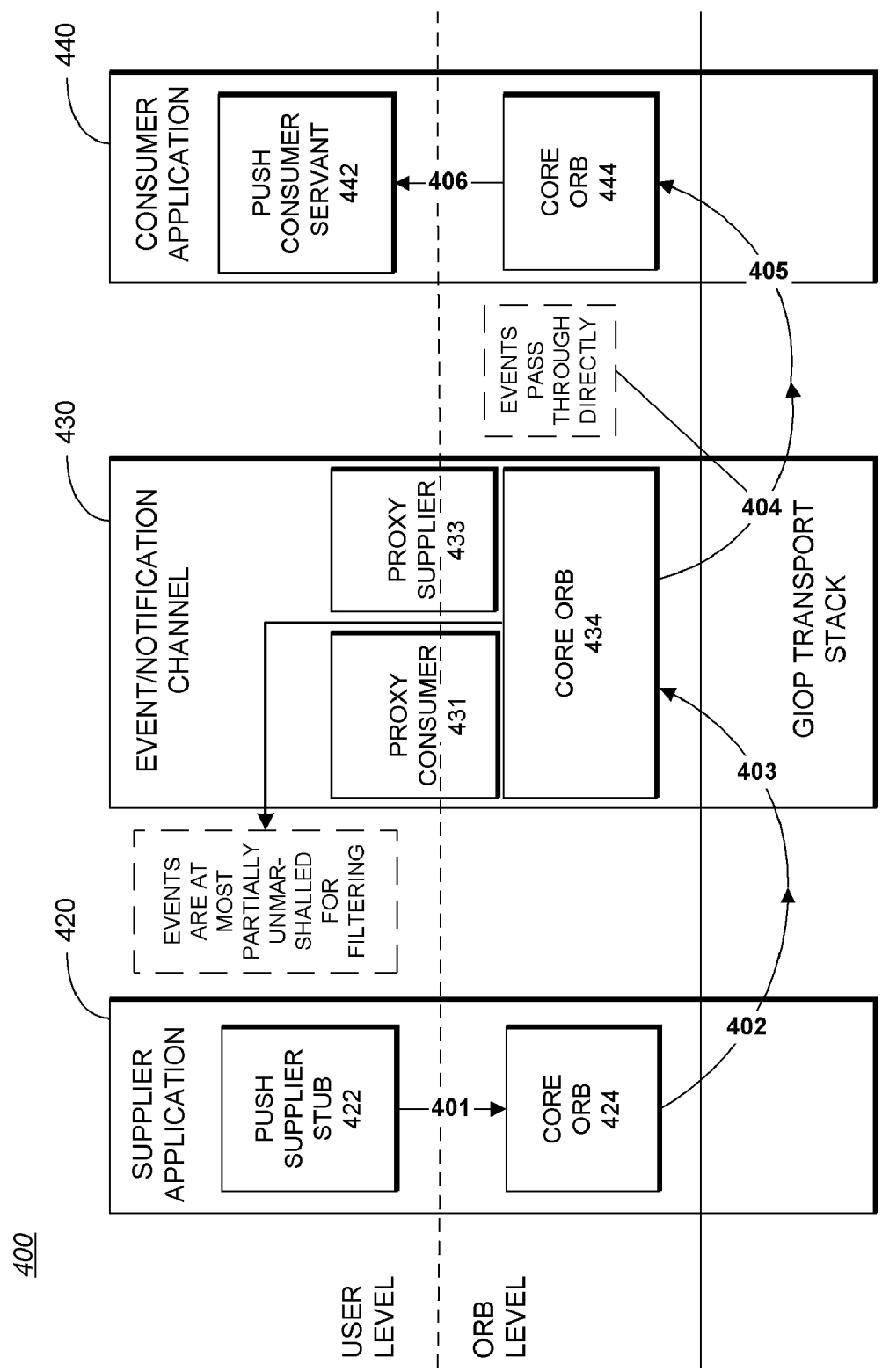
FIG. 4 illustrates an environment in which an ORB-level event/notification channel of the present invention is used to push an event from a supplier application to a consumer application.

The present invention uses a different approach in supporting the OMG Event and Notification Service at the Object Request Broker (ORB) level rather than at the user level. FIG. 4 illustrates an environment 400 in which an ORB-level event (event/notification) channel of the present invention is used to push an event from a supplier application to a consumer application. As shown at FIG. 4, a supplier application 420 pushes an event to a consumer application 440 through an event channel 430. The event/notification push operation is not implemented as a method invocation on a user-level proxy consumer. Instead, the core ORB directly queues and routes event messages to downstream consumers without un-marshaling (unless there are filters) and re-marshaling events at the event channel 430 of the present invention. Even if there are filters, the system of the present invention will still not re-marshal event message bodies. Instead, the original event payloads (message bodies) are retained and will be used for forwarding after filtering. During routing of GIOP (General Inter-ORB Protocol) events, the system of the present invention uses a series of advanced techniques to adjust their payload alignment.

On each event invocation made from a supplier application 420 to a consumer application 440, the event channel 430 performs GIOP message level request routing as shown at 401, 402, 403, 404, 405, 406 at FIG. 4 instead of application level invocation and delegation. More particularly, the push supplier stub 422 of a supplier application pushes a message event to the event notification channel 430 through the core ORB 424, 434 as depicted at 401, 402, 403. The message event is then passed directly through to the push consumer servant 442 through the core ORB 434, 444 as depicted at 404, 405, 406. Significantly, the proxy consumer 431 and the proxy supplier 433 at the event channel 430 are not required to un-marshal and re-marshal the body (or payload) of each message. The exception is that if filtering is involved, message bodies may be partially un-marshaled for filtering purposes.

With GIOP message level routing, typed events (in the form of GIOP Request Messages) routed through an event channel will not be un-marshaled and re-marshaled (decoded/encoded) by the channel. That is, typed event channels neither de-marshal nor re-marshal typed event bodies. The typed channel only reads GIOP message headers to obtain proxy and operation signature information. Based on this information, the channel replicates typed events (e.g., sends GIOP request messages) to all subscribed consumers with the original operations and message bodies (payloads).

In other words, an event channel implementation constructed in accordance with the present invention generally only requires the reading of the message headers (i.e., the GIOP message header and Request Header). The body (or payload) of the event message (e.g., GIOP Request Message) is treated as raw data and does not need to be un-marshaled and re-marshaled. Efficiency is increased as the system of the present invention is not required to un-marshal (decode) the message payload at the event channel, read and understand the raw data, and then re-marshal (encode) this raw data (the message body) at the event channel in order to properly deliver the message to consumers.

In handling typed event replicating, the channel directly appends any original GIOP request message payload (body) that is received to the outgoing GIOP request messages. The channel may decode a typed event message body for filtering purposes. However, it retains the original GIOP message payload (body) and directly appends this payload to an outgoing message if its decoded result passes through the filter. Outgoing GIOP message payloads are not encoded from the decoded payloads. The decoded results are only used by filters. Therefore, regardless of the number of consumers a given event is going to be forwarded to, the total number of encodings (i.e., re-marshalings) is zero and the total number of decodings (i.e., un-marshalings) is either zero (no filter) or one (with filter). In addition, because the encoding is only for filtering, the channel may only partially decode the typed event GIOP message body (payload) for filter evaluation.

Figure 5:
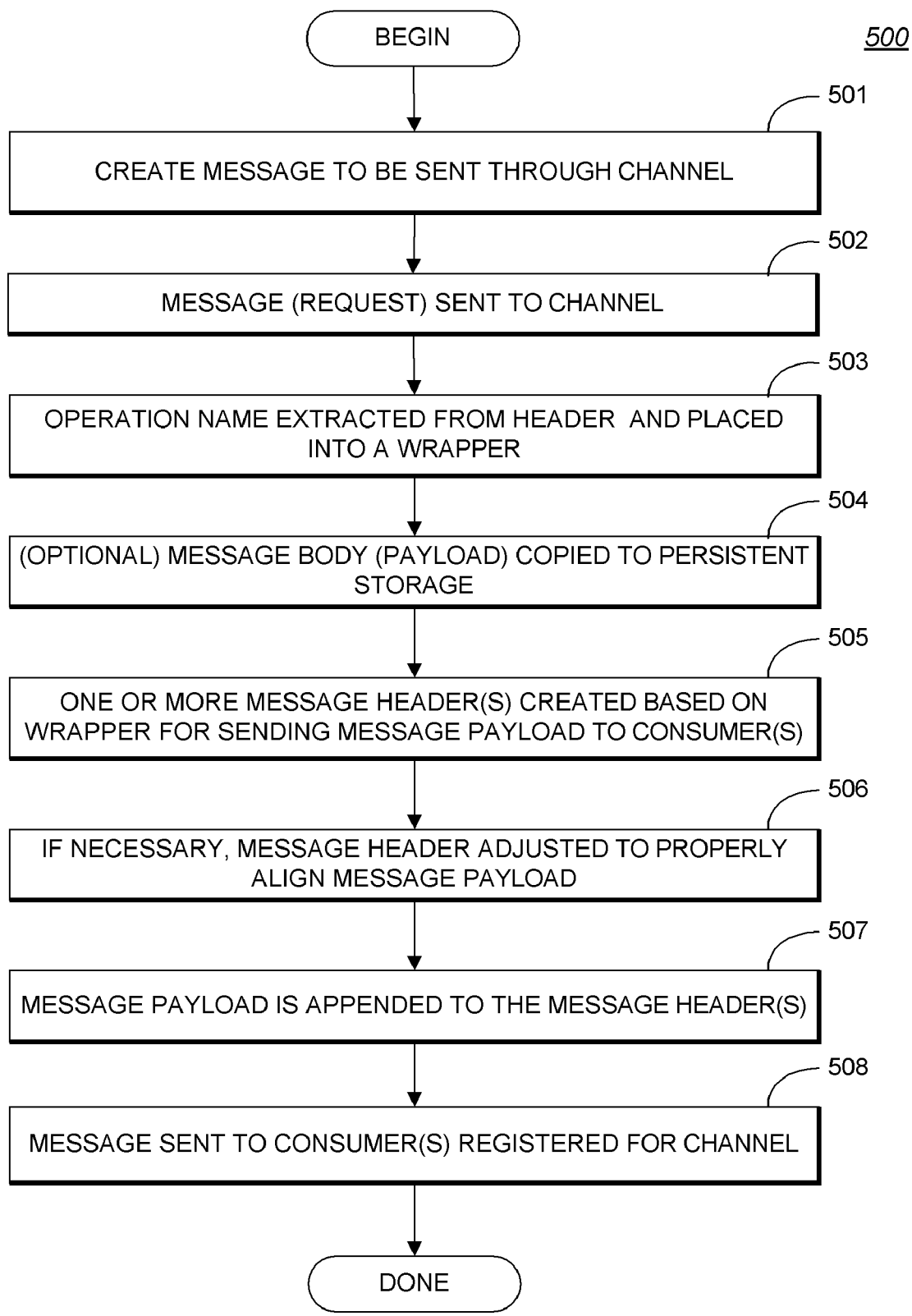
FIG. 5 is a flowchart illustrating the operations of the system of the present invention in handling a message event sent from a supplier to a consumer.

The system and methodology of the present invention provides a typed CORBA event channel that provides good performance. Experience indicates that a typed event channel implemented using the system and methodology of the present invention can be several times faster than existing typed event channel implementations. In addition, the typed channel provided by the present invention is elegant, efficient, and safe on both supplier and consumer sides. The approach of the present invention also provides other useful features which are difficult to support in either user-level implementations or ad hoc solutions. When combined with other ORB technologies, specifically distributed processing and transparent event buffering, a system constructed in accordance with the present invention is able to reach an unusually high event throughput at a low CPU cost. The system and methodology of the present invention will now be described in greater detail Methods of Operation FIG. 5 is a flowchart 500 illustrating the operations of the system of the present invention in handling a message event sent to an event channel. The following discussion uses an example of pushing a typed event through an event channel. The same methodology may also be used for event-pulling messages. Although for purposes of this discussion, an example of a single message is used, those skilled in the art will appreciate that a number of different types of messages may be sent to (and from) various consumers and suppliers utilizing the system and methodology of the present invention. The following description presents method steps that may be implemented using computer-executable instructions, for directing operation of a device under processor control. The computer-executable instructions may be stored on a computer-readable medium, such as CD, DVD, flash memory, or the like. The computer-executable instructions may also be stored as a set of downloadable computer-executable instructions, for example, for downloading and installation from an Internet location (e.g., Web server).

The process begins at step 501 with the creation of a request for an event message to be sent through a particular event channel. For example, a change in the price of a particular stock may trigger an event in a particular stock trading application. In response, an event message request is created in a structure which includes a Request Header (sometimes referred to herein simply as a "header") and a body (sometimes referred to herein as a "payload"). The body parameters may, for instance, consist of typed data such as a string (e.g., a string "name" indicating the stock name or stock symbol) and a float (e.g., a float "price" representing the current stock price). The message sent by the supplier has a Request Header that includes the operation name (a string). The message also identifies a particular channel (i.e., the supplier sends the message to a particular channel enabling the channel to be identified). The message body (payload) is typically a byte array.

At step 502 the supplier sends the event message (e.g., a GIOP Request Message) to a particular event channel. The supplier sends the message to the event channel utilizing a generic invoke as described in more detail below. The message includes both a header (e.g., a GIOP Request Header) and a body or payload (e.g., GIOP Request Body). In this example the message payload includes the string "name" and the float "price". The header (Request Header) also includes the operation name. At step 503 a wrapper is created and the operation name is extracted from the header and is placed into the wrapper. A reference to the body (payload) is also retained in a data structure so that the body may subsequently be appended to messages sent by the event channel to consumers. However, the payload itself is not decoded (i.e., un-marshaled).

At (optional) step 504 the body (payload) may be copied into persistent storage, if desired. For example, in the currently preferred embodiment the body is copied into a database. At step 505 one or more message headers are created based upon the wrapper for sending the payload (body) to registered consumers (i.e., those consumers that have subscribed to this particular channel). Each message header that is created includes the operation name as well as information about the specific consumer that is to receive the message (e.g., the consumer's address to which the message is to be sent). Each particular channel has an associated list of subscribers (registered consumers). Messages received by a particular channel are routed to its subscribers. Filtering may also be used, if desired, as described above.

At step 506, if necessary the message header is adjusted to properly align the message payload. As described below in greater detail, in certain circumstances (e.g., a supplier application and/or a consumer application using a version of GIOP prior to GIOP version 1.2), the alignment of the message body may need to be adjusted so that the message body may be properly un-marshaled after it reaches its destination. For example, the message header may be extended so that the message payload is properly aligned at an offset that is a multiple of 8 bytes. This ensures that the recipient can accurately identify where the message body (payload) starts and the length of the message payload. Absent this message alignment, the recipient may not be able to properly un-marshal (decode) and read the message body.

After the message header is created and the alignment is adjusted, at step 507 the body (payload) is appended to the message header. Significantly, the body (payload) does not need to be marshaled and un-marshaled by the event channel. At step 508 the message is sent to the consumers registered for the channel. These consumers may then un-marshal the message body (payload) and process the message body, as desired. Although the above discussion uses an example of a push operation from a supplier application to a consumer application, those skilled in the art will appreciate that the system and methodology of the present invention may also be used for pushing and pulling various different types of message events through various event channels on both the supplier and consumer sides.

Detailed Internal Operation

Performance and Scalability

Intuitively, performance measurements of a message delivery system in general are about its throughput and latency, namely "the number of transferred messages per second" and "the end-to-end traversal time of each individual message" respectively. An ideal system should have the highest throughput and lowest latency. In reality, a given implementation can achieve both, however, not simultaneously. Accordingly, the system of the present invention allows users to choose between high throughput and low latency. The primary use of the OMG Event and Notification Service is for uni-directional, asynchronous event transfers. This implies applications using this service are not impacted by reasonable levels of event latency. Therefore, the performance of an implementation of this service should be measured by event throughput instead of latency. Usually, asynchronous transfer may have slightly higher latency than synchronous communication but, in return, have higher throughput and lower CPU usage. Unfortunately, many user-level OMG Event and Notification Service implementations today have higher latency and also lower throughput than synchronous communication. Given the definition of relevant performance criteria, the scalability criteria here should properly be defined as the behavior of aggregate throughput and CPU usage with an increasing number of communication participants.

Moreover, the OMG Event and Notification Service is not designed merely as a data transfer facility. Business applications frequently use content rich events instead of bulk data, namely a single long string or large sequence of octet data. The performance of transferring multi-component events and bulk data events can be significantly different for user-level channel implementations. Unfortunately, most user-level Event and Notification Service implementations today are evaluated using bulk data transfer tests and claim that overhead from event un-marshaling and re-marshaling is negligible. However, these user-level implementations fail to perform in transmitting multi-component events, especially when multi-field IDL structures, unions, and enums are used in events. Multi-field IDL structures, unions, and enums are used frequently in various TMN alarms or notifications defined by international or industry organizations (e.g., ITU-T X.780 and TMF 814A).

The system of the present invention has been tested with various real world events used in telecommunication, data communication, finance, defense and e-commerce applications to evaluate performance (events per second) and scalability (e.g., CPU usage). In this document, results based on the ITU-T (International Telecommunication Union—Telecommunication Standardization Sector) Attribute-Value-Change (AVC) event are described. ITU-T defines 15 TMN events/alarms in the X.721 and X.73x series. They are mapped to OMG typed events in X.780 as well as to OMG structured events by specified rules.

As an ORB-level implementation, the system of the present invention is not sensitive to event complexity. However, for purposes of comparison with other user-level Event and Notification Service implementations, the evaluations discussed herein were not made with the most complicated events or with the most expensive union and enum. Instead, the "AVC" event, which has an average complexity, was chosen for testing purposes. The results of testing using the system of the present invention together with Borland® Enterprise Server, VisiBroker® Edition (available from Borland Software Corporation of Scotts Valley, Calif.) indicate that the CPU usage of the ORB-level channel of the present invention is low when compared with the CPU usage of an ideal user-level channel. The channel throughput differences between the system of the present invention and an ideal user-level channel are also significant. The system of the present invention shows consistent superior throughput on all event types.

Persistent Event Results

With event persistence enabled, pending events in channels are generally logged into persistent storage to avoid event loss due to normal maintenance shutdown or unexpected system (e.g., process or OS) failure. Usually, the backend database, the operating system kernel, and the hardware disk controller all have an associated I/O cache. To ensure that no data is lost due to software failure, data that is buffered in the database or OS kernel block I/O caches are typically flushed to a physical disk (or a hardware cache, if any) by an insertion commit transaction or an "fsync/flush" OS kernel block buffer. Data buffered in the hardware cache will not be lost due to database or OS failures but can be lost during hardware or power failure. However, hardware and power fault tolerance issues can be addressed by various RAID products or backup power supply rather than by software. Therefore, in a typical implementation the application should normally use hardware cache if it is available. As a common practice, database TPC benchmark results are usually performed using a hardware cache. Nevertheless, to be verifiable on systems which do not have I/O cache on their disk controllers, testing was performed without a hardware cache for comparison purposes. In these tests the system of the present invention achieved consistently higher throughput than traditional user-level Event and Notification Service implementations.

Using event persistence with event buffering provided by the system substantially reduces overhead from network and disk I/O latency. In this scenario, events are transferred and committed in batch instead of individually. To explicitly flush and commit pending buffered events, a supplier application issues a "_non_existent( )" ping on the proxy consumer or for typed channel, on the typed "<I>" interface. If the user does not explicitly flush/commit, a system constructed in accordance with the present invention will implicitly flush/commit on buffer overflow and/or timeout. Success of this ping (namely a "FALSE" return value) ensures that all pending events have been sent to the channel and committed to the physical device. On failure of this ping (either an exception or a "TRUE" return value), applications should assume that some pending events were lost or failed to be logged into the physical device. This is semantically similar to a sequence event. A "push_structured_events( )" failure indicates that one or more events in the sequence are either lost or not logged. Therefore, the equivalent recovery strategies can be employed.

The testing performed demonstrates that conventional user-level event channels provide poor performance compared to the ORB-level event channels of the present invention. Several factors contribute to the poor performance of conventional user-level channels. First, user-level channels fully un-marshal each event received by the proxy consumer as previously illustrated at FIG. 3. On replicating events to downstream consumers, user-level channels also marshal each event as many times as the number of connected consumers. In addition, user-level typed channels use dynamic code (e.g., DII/DSI/IR) to handle typed events. User-level channels also rely on dynamic code (DynAny for instance) to unpack each event into multiple serializable data fields for event persistence. Moreover, user-level channels cannot support distributed processing and event buffering transparently.

In contrast, the design and methodology of the system of the present invention provides improved performance for several reasons. First, the present solution does not unmarshal events unless there is a filter attached as described above and illustrated at FIG. 4. Also, the system performs no event payload marshaling regardless of the number of downstream consumers. In addition, the system's typed channel does not use dynamic code (e.g., DII/DSI/IR) unless there is a filter attached. The system also directly writes event payloads into persistent storage in the original CDR format. This avoids the redundant "un-marshaling and then serializing" overhead. These attributes significantly reduce the channel's CPU cost (i.e., usage of CPU resources) in the replication of events, including structure rich, transient or persistent, typed or untyped/structured events. In addition, when used in combination with a preferred Object Request Broker, the system supports distributed event processing and event buffering, transparently. This mechanism substantially improves channel throughput.

User-Level Event Batch is Disadvantageous

Compared to the transparent ORB-level event buffering/batch mechanism, the user-level event batch using sequence event has a number of disadvantages. One disadvantage is that the user-level event batch mechanism is not transparent to applications. With the user-level event batch, whether events are sent in batches is not only a dynamic quality of service (QoS) option, but also a static syntax decision. Applications need to be explicitly written using the sequence event specific API. Also, only structured events can be transferred in batches. Structured events usually require substantially larger event sizes and higher CPU usage than corresponding typed events. Consequently, using user-level event batch may end up consuming significantly more bandwidth and CPU resources. For filtering, resizing, and concatenating user-level sequence events, all structured events in these sequences have to be fully un-marshaled and re-marshaled to adjust alignment offset and possible byte-order differences. This introduces considerable overhead and undesirable restrictions. These drawbacks effectively defeat the objectives of user-level event batch.

In contrast, the system of the present invention only supports end-to-end push model user-level sequence events for application portability. Furthermore, sequence and structured events are independent and invisible to each other. Also, as an ORB-level implementation, the system of the present invention, in its presently preferred embodiment, does not support so-called event translation. Support for this kind of translation introduces substantial overhead and restrictions in an implementation but its usefulness and necessity are not justified by real applications.

Valuetype Penetration

With all traditional user-level OMG Event and Notification Service implementations, attempting to send a valuetype through a channel results in a CORBA "MARSHAL" exception. This is referred to as a "valuetype impenetrable [channel]". Existing user-level OMG Event and Notification Service implementations typically do not support sending valuetypes to the notification service. In these traditional non-proprietary implementations, it was generally considered that valuetype penetration could not be achieved without a change to GIOP and breaking backward compatibility. Therefore, some vendors and end users have implemented various proprietary solutions, such as dynamically loading native value factories by channels. The hypothesis behind this approach is relatively simple. The core ORBs can only un-marshal application specific valuetypes using the corresponding value factories. Application specific value factories are implemented either by application developers or by IDL pre-compilers for valueboxes. Usually, an event channel has no application specific value factory built-in, therefore, its core ORB has no universal approach to un-marshal received events containing application specific valuetypes (or valueboxes). The user-level channel implementation implies full event un-marshaling and, therefore, immediately fails in this dilemma.

The system of the present invention provides an OMG Event and Notification Service implementation supporting seamless valuetype penetration. The present invention provides a non-proprietary solution that is based on the OMG standard GIOP protocol and is fully interoperable with third party applications/ORBs. The solution does not load value factories/classes locally or remotely, does not rely on knowledge of valuetype's IDL definitions, supports both standard marshaling and custom marshaling, is supported in all event types (i.e., untyped, structured, sequence, and typed events), and works even if there are filters downstream. This valuetype penetration capability also enables the system of the present invention to provide seamless J2EE (Java 2 Enterprise Edition) support.

Implementation of Typed Event and Notification Service

OMG Event and Notification Service Styles

The OMG Event and Notification Service specifications define two major styles of service, namely infrastructure-defined event service and typed event service. In an infrastructure-defined event service, event interfaces are pre-defined by the OMG, including untyped event, structured event, and sequence event. The typed event channel, as defined in the OMG Typed Event and Notification Service, does not predefine event interfaces. Typed event interfaces are defined by applications using the standard OMG IDL.

Infrastructure-Defined Event Services are Easy to Implement

As acknowledged in the OMG Notification Service specification "implementers have found [typed event communication as defined by the OMG Event Service] particularly difficult to deal with" (OMG Notification Service Specification, Section 2.2, page 2). A motivation behind the infrastructure-defined event service is to have a solution that is relatively easy to implement. Event interfaces in infrastructure-defined untyped, structured, and sequence channels are pre-defined in the applicable OMG specifications. To support various application specific event compositions, infrastructure-defined event interfaces unavoidably use CORBA "Anys" and name-value pairs in event definitions. This introduces several disadvantages from a user's perspective. First, infrastructure-defined event channels are slower than typed event channels. Infrastructure-defined events also typically have significantly larger event sizes. In addition, infrastructure-defined events require more type-unsafe dynamic manual code to pack and unpack user data into/from events. Infrastructure-defined events also do not have a formal, unified, and widely adopted event description language, nor the associated mapping tools provided by such a language.

Benefits of Typed Event Service

The typed event channel, as defined in the OMG Typed Event and Notification Service, does not predefine event interfaces. Typed event interfaces are defined by applications using the standard OMG IDL. Invoking an operation on an application defined typed event interface (namely the "<I>" interface) sends a typed event to the channel. Consumer applications also receive the typed event by implementing and activating an object with the same application defined interface. A properly implemented typed event channel brings many benefits to application developers and users. With a typed event channel, events are formally defined via IDL interface operations and event packing and unpacking operations utilize type-safe, static stub/skeleton code instead of dynamic, manual code. In addition, typed events do not use any "in-band" type code. Therefore, they have smaller size and lower CPU usage than equivalent untyped or structured events. Many users have realized the advantages of OMG Typed Event and Notification Service implementations. ITU-T for example defines the CORBA/TMN framework essentially using typed channel and suggests that a structured channel should only be used if a typed one is not available.

User-Level Typed Channels are not Scalable

For the reasons described above, a reasonable typed channel implementation generally has better performance and scalability than any untyped or structured channels. Unfortunately, most existing typed channels are implemented on the user-level using DSI/DII/IR mechanisms. Therefore, they perform relatively poorly and are cumbersome to use. As a result, they are generally unsuitable for business applications.

ORB-Level Typed Channels Provide Improved Performance

The system and methodology of the present invention provides an OMG Typed Event and Notification Service implementation that is designed at the ORB level and does not use IR (Interface Repository) unless there is a filter downstream. As a result, the typed channel provided by the present invention is not only less restrictive and more convenient to use, but also it is significantly faster than any user-level typed or infrastructure-defined channel. The improved performance provided by the system and methodology of the present invention has been demonstrated by throughput benchmark tests.

For the above reasons, the use of the typed event channel provided by the present invention has a number of advantages compared to infrastructure-defined untyped and structured/sequence events. One advantage is that its event model is object-oriented. Typed events are formally defined as IDL interface operations. Also, the process of packing and unpacking typed events involves the use of type-safe, static stub/skeleton code. Typed events are also noticeably smaller than infrastructure-defined events. In addition, the system throughput for typed events has been observed to be significantly higher than that of infrastructure-defined events. Moreover, typed event channels can automatically support J2EE applications.

Typed Event and Notification Service Implementation

At a high level, the process of pushing an event message from a supplier to a consumer through an ORB-level event channel using the system and methodology of the present invention can be illustrated by the following example. When an event message is sent by the supplier, the message is addressed to a particular event channel (e.g., a first channel referred to as "channel one"). An event message request sent by the supplier includes both a message header (e.g., a GIOP Message Request Header) and a message body or payload (e.g., a GIOP Message Request Body). When the event channel receives the message, it reads and parses the message header to obtain information about the message. However, the event/notification channel of the present invention typically does not need to read the payload. In the case of filtering, the payload may need to be read once as described above.

Based on the information extracted from the message header, the event channel creates an "envelope" or "wrapper" for delivery of the message to each of the consumers registered for this particular channel (e.g., channel one in this example). The wrapper that is created uses a standard format, but contains consumer-specific information so that the message may be delivered to each of the consumers that are registered for channel one (e.g., subscribers A, B, and C). For example, the name of the subscriber will differ on each of the wrappers that is created, although the message name (or operation name) on each of the messages is the same. The payload is then appended to the wrapper and delivered to subscribers A, B, and C. The following "VISGIOPProxy-TypedPushConsumer::invoke" and "VISGIOPProxyPushSupplier::_push_to_target" code segments illustrate two routines for implementing the typed event/notification channel provided in the currently preferred embodiment of the present invention.

VISGIOPProxyTypedPushConsumer::invoke

The following "VISGIOPProxyTypedPushConsumer::invoke" method illustrates the first part of the process of delivery of a message event through an event channel in the currently preferred embodiment of the present invention:

```
1:   void
2:   VISGIOPProxyTypedPushConsumer::invoke(
3:   CORBA::ServerRequest_ptr req)
4:   {
5:   // a remote pushing
6:   EventWrapper* wrap = _manager->create(req->strm( ),
     req->opname( ));
7:
8:   push(wrap);
9:   EventWrapper::_release(wrap);
10:  return;
11:  }
```

In this case a supplier is sending a message event through an event channel. The above "VISGIOPProxyTypedPushConsumer::invoke" method is called when a message event request (i.e., the request "req") is received by the event channel. It should be noted that at this point, the message has already been delivered to the channel, so the channel is already known. The request ("req") includes both a header (or request header) and a payload (or request body).

As illustrated above at line 6, the operation name ("op_name") is extracted from the header and put into a wrapper. The operation name generally identifies the subject matter of the message. The payload (body) itself is not un-marshaled or parsed in the creation of the wrapper. Next, the wrapper is put into a queue as illustrated at lines 8-9. The wrapper is then used to create messages for delivery to consumers as illustrated below by the "VISGIOPProxyPushSupplier::_push_to_target" method which will now be described.

VISGIOPProxyPushSupplier::_push_to_target

On the other side of the queue that is described above, the following "VISGIOPProxyPushSupplier::_push_to_target" method pushes the message event to each of the registered consumers:

```
1:   void
2:   VISGIOPProxyPushSupplier::_push_to_target(
3:   EventWrapper* wrap,
4:   CORBA::UShort lowdeg)
5:   {
6:   VISGlobalTable* tls = VISGlobalTable::instance( );
7:   tls->byte_order = wrap->_payload_byte_order;
8:   tls->payload_curoff = wrap->_payload_curoff;
9:
10:  CORBA::MarshalOutBuffer_var obuf;
11:  obuf = _consumer->_vis_request(wrap->get_operation( ),
     0x01);
12:
13:  obuf->put(wrap->payload_ptr, wrap->_payload_len);
14:
15:  CORBA::MarshalInBuffer_var ibuf;
16:
17:  ibuf = _consumer->_invoke(obuf);
18:
19:  tls->payload_curoff = 0UL;
20:  }
```

The above "VISGIOPProxyPushSupplier::_push_to_target" method illustrates the process of pushing a message event to a target consumer. This routine is used for sending a message to each of the registered consumers. At line 11, a message header is created for sending the message to the consumer based on the previously created wrapper. The message header that is created at line 11 does not yet have an associated message payload. However, this message header includes the operation name and the name of the registered consumer that is the target of this message. Next, the original payload (request body) is appended to the wrapper as shown at line 13. Essentially, the payload is pasted (or put) into the message. The message is then sent for delivery to the consumer.

As illustrated above, the methodology of the present invention does not require the message payload to be decoded by the event channel and provides for the event channel to be generically invoked. In contrast, prior art systems require the message payload to be parsed and understood (i.e., un-marshaled) and then reconstructed (re-marshaled) for delivery to consumers, which is a considerably less efficient process.

Ensuring Proper Message Payload Alignment

It should be noted that the currently preferred embodiment of the system of the present invention (sometimes referred to below as the "VisiNotify" system) operates in conjunction with General Inter-ORB Protocol (GIOP) version 1.2 applications. In order to also support interoperability with GIOP 1.0/1.1 applications, certain additional steps have been taken in the system of the currently preferred embodiment to ensure proper alignment of the message payload so that the above-described "cut and paste" operations are performed correctly.

The system of the present invention provides interoperability with GIOP 1.0/1.1 applications if they meet the restriction of having a payload offset (i.e., the length of principal in GIOP 1.0/1.1 event pushing Request Headers) equal to a multiple of 4 bytes (i.e., equal to 0, 4, 8, 12, and so forth). By default, most applications use a zero length principal and therefore automatically meet this restriction. In addition, this restriction is only for push requests and does not apply in the case of pull supplier applications or push/pull consumer applications.

When a push request is received with a payload offset that is not aligned with a 4-byte boundary, the system typically throws a "CORBA::MARSHAL" system exception. Therefore, one can assume that all valid payload flows (either pushed in or pulled in) that do not generate a "CORBA::MARSHAL" exception are properly aligned at a 4-byte boundary. Given this assumption, the support of GIOP version 1.0 and version 1.1 applications is based on one of the two GIOP version selection and alignment adjustment scenarios described below.

The first scenario (referred to below as "Scenario A") involves using the GIOP 1.0/1.1 Request Header principal to adjust the payload alignment of an event pushing request. More particularly, this Scenario A involves an application using GIOP 1.0/1.1 to push an event under either one of following cases: the push consumer's GIOP version is either 1.0 or 1.1 (even if the original event from the supplier is 1.2 and aligned at 8 bytes); or the event payload received from the supplier is aligned on a 4 byte boundary, but is not aligned on an 8 byte boundary (even if the consumer reference profile version is 1.2). The following "get_giop_version" code segment from a "vgconnect.C" module illustrates the process for determining whether these conditions are applicable:

```
 1:  //
 2:  // Code from vgconnect.C.Scenario A.
 3:  //
 4:
 5:  GIOP::Version& VISGIOPProtocolConnector::
      get_giop_version( )
 6:  {
 7:  if(VISGlobalTable::is_not_visinotify( )) {
 8:  assert(_profile);
 9:  return _profile->version( );
10:  }
11:
12:  // For scenario A:
13:  // Cases we need to use lower giop version
14:  // 1. The consumer is in low version.
15:  // 2. The received payload isn't aligned on 8.
16:  //
17:
18:  GIOP::Version& version = _profile->version( );
19:
20:  if(version.minor < 0x02 ) {
21:  // case 1.
22:  return version;
23:  }
24:
25:  VISGlobalTable* tls = VISGlobalTable::instance( );
26:
27:  if(tls->payload_curoff%8) {
28:  // case 2.
29:  static GIOP::Version v1_0 = {0x01, 0x00};
30:  return v1_0;
31:  }
32:
33:  // either normal request (i.e. payload_curoff == 0) or
34:  // it already aligned on 8.
35:  return version;
36:  }
```

The "if" condition shown above at lines 20-23 checks to determine if the push consumer is using an older version of GIOP (i.e., one earlier than version 1.2). At lines 27-31, a check is made to determine if the payload is aligned at 8 bytes.

If either of the above-described circumstances are applicable, the principal field of GIOP 1.0/1.1 Request is used to adjust the end of the header to the same alignment as the payload alignment, that is, on either a 4 byte boundary or an 8 byte boundary. The following code segment from a "vgmsg.C" module illustrates this process:

```
 1:  //
 2:  // Code from vgmsg.C.Scenario A.
 3:  //
 4:
 5:  void VISGIOPRequest::_marshal_out_1_x( )
 6:  {
 7:  if(!VISGlobalTable::use_local_byte_order( )) {
 8:  VISGlobalTable* tls = VISGlobalTable::instance( );
 9:  this->byte_order(tls->byte_order);
10:  }
11:  VISGIOPOutputBuffer& obuf = _output;
12:  // marshal the header
13:  obuf << _service_context;
14:  obuf << _request_id;
15:  obuf << _response_expected;
16:  obuf << _object_key;
```

-continued

```
17:  obuf << _operation;
18:  // write out principal,
19:
20:  if(VISGlobalTable::is_not_visinotif( )) {
21:  // normally, always zero length principal
22:  obuf << (CORBA::ULong)0UL;
23:  }
24:  else {
25:  // For visinotify
26:  VISGlobalTable* tls = VISGlobalTable::instance( );
27:
28:  if(tls->payload_curoff == 0UL) {
29:  // normal request -- still zero length principal
30:  obuf << (CORBA::ULong)0UL;
31:  }
32:  else {
33:  // visinotify channel pushing request, use principal to adjust
34:  // alignment. Scenario A.
35:  obuf.align(4); // align for principal count.
36:  CORBA::Long delta =
37:  (tls->payload_curoff)%8UL - (obuf.curoff( ) + 4UL)%8UL;
38:  delta = (8L+delta)%8L;
39:  obuf << (CORBA::ULong)delta;
40:
41:  if(delta) {
42:  static char princ_data[7] =
43:    {0x00,0x00,0x00,0x00,0x00,0x00,0x00};
44:  obuf.put(princ_data, delta);
45:  }
46:  }
47:  }
48:  // lsilva - set dataOffset
49:  obuf.dataOffset(obuf.curoff( ));
50:  }
```

As illustrated above, a length 0 or 4 "dummy" principal is used to adjust the outgoing request payload offset so that it has the same alignment as the original payload offset (i.e., at either a 4 byte or an 8 byte boundary). If the original payload is aligned on an 8 byte boundary and the push consumer's profile version is 1.2 or later, a GIOP 1.2 Request can still be used for pushing the event to the consumer.

The second scenario ("Scenario B") involves the use of a GIOP 1.0/1.1 Reply Header service context to adjust the payload alignment of an event-pulling reply. If a GIOP 1.0/1.1 event-pulling request is received, the same version should be used in the reply (i.e., GIOP 1.0/1.1 should be used in constructing the reply). The following "VISGIO-PReply" code segment illustrates the handling of Scenario B:

```
 1:  VISGIOPReply::VISGIOPReply(CORBA::UShort version,
 2:      CORBA::ULong request_id,
 3:      const IOP::ServiceContextList& service_context,
 4:      ProtocolEngine::ReplyStatus reply_status)
 5:  : VISGIOPFragmentable(version, GIOP::Reply),
 6:  VISGIOPMessage(version, GIOP::Reply,
      MSG_FRAGMENTABLE),
 7:  _reply_status(reply_status)
 8:  {
 9:  _service_context = service_context;
10:  _request_id = request_id;
11:  CORBA::ULong payload_curoff = 0UL;
12:
13:  if(!VISGlobalTable::use_local_byte_order( )) {
14:  VISGlobalTable* tls = VISGlobalTable::instance( );
15:
16:  this->byte_order(tls->byte order);
17:  payload_curoff = tls->payload_curoff;
18:  }
19:
```

-continued

```
20:   assert(__output);
21:   VISGIOPOutputBuffer& obuf = __output;
22:   // write out the reply
23:   if (version == VISGIOPMessage::VERSION_1_0 ||
24:     version == VISGIOPMessage::VERSION_1_1) {
25:     // GIOP 1.0 or 1.1 write
26:     CORBA::ULong offset = obuf.curoff( ); // mark the offset
27:     obuf << __service_context;
28:     if(payload_curoff != 0UL) {
29:       // for visinotify
30:       obuf.align(4);
31:       if(payload_curoff%8 != obuf.curoff( )%8) {
32:         //
33:         // The payload could be from a 1.2 supplier or
34:         // a 1.0/1.1 supplier. When it is from 1.0/1.1
35:         // supplier, we requires its payload must be
36:         // aligned on either 4 or 8. As long as application
37:         // doesn't use GIOP 1.0/1.1 principal (i.e. principal
38:         // is zero-length), this condition is always met.
39:         //
40:         CORBA::ULong len = __service_context.length( );
41:         __service_context.length(len + 1);
42:         IOP::ServiceContext& sc = __service_context[len];
43:         sc.context_id = 141000L; // dummy, todo: pick up a id
44:         // from our assigned range.
45:         static CORBA::Octet ctx[4] = {0x00, 0x00, 0x00, 0x00};
46:         sc.context_data.replace(4, 4, ctx);
47:         obuf.seekpos(offset); // go back to the marked position
48:         obuf << __service_context; // remarshal it to cause a
49:         // extra 12 bytes added into
50:         // the message to adjust the
51:         // payload start point.
52:         // __service_context.length(len); // don't need to
53:         // recover the length
54:       }
55:     }
56:     obuf << request_id;
57:     obuf << reply_status;
58:   } else {
59:     // GIOP 1.2
60:     obuf << request_id;
61:     obuf << reply_status;
62:     obuf << __service_context;
63:     // pad to next 8-byte boundary. See CORBA2.3 specification,
64:     // section 15.4.2.2
65:     obuf.do_data_alignment_padding(version);
66:   }
67:   // lsilva - set dataOffset
68:   obuf.dataOffset(obuf.curoff( ));
69: }
```

As illustrated in the above code segment, when constructing a GIOP 1.0/1.1 Reply Header, its service context field is used to adjust the payload alignment. A "dummy" service context (with a length of 4 bytes) can be appended at the end of the service context list to adjust the payload offset when necessary.

In the presently preferred embodiment, if a GIOP 1.2 event-pulling request is received, the VisiNotify system prepares a reply and has no opportunity to perform above payload offset adjustment when it needs to deliver an event originated from a GIOP 1.0/1.1 supplier. This issue is addressed by either rejecting the flow of GIOP 1.0/1.1 events into the channel in the first place or, alternatively, by forcing consumers to pull with GIOP1.0/1.1 only. A "vbroker.notify.backcomp" property is introduced in the VisiNotify system of the currently preferred embodiment to enable a user to select one of these choices. This property currently can only be set by the user at the startup time of the system and typically cannot be changed thereafter.

For example, if the "vbroker.notify.backcomp" property is set to "false", the system will reject an event pushed from supplier using a GIOP 1.0/1.1 Request. In this case, a supplier pushing an event with GIOP 1.0/1.1 into the event/notification channel will typically receive a "CORBA::MARSHAL" exception. Also, the system will prohibit GIOP 1.0/1.1 pull suppliers. Connecting to the event/notification channel with a GIOP 1.0/1.1 pull supplier will generally cause a "CORBA::IMP_LIMIT" exception. If the "vbroker.notify.backcomp" property is set to "false", only a GIOP 1.2 pull request may be used to pull events. In this situation proxy pull supplier references are exposed as GIOP 1.2 references.

Therefore, in this circumstance, the VisiNotify system does not need to adjust payload alignment, because all incoming events are received in a GIOP 1.2 Request/Reply format and the message payload will already be aligned on an 8-byte boundary. Although setting the "vbroker.notify.backcomp" property to "false" will prohibit GIOP 1.0/1.1 supplier applications, it does not exclude GIOP 1.0/1.1 consumer applications. GIOP 1.0/1.1 consumer (push/pull) applications can still be used in this situation. However, using this property setting enables the channel to expose its proxy pull suppliers as GIOP 1.2 references to take advantage of some of the features supported in GIOP 1.2.

On the other hand, if the "vbroker.notify.backcomp" property is set to "true", the system will operate in conjunction with a wider range of supplier and consumer applications. With this setting, the system will not put a GIOP version restriction on either supplier or consumer applications. However, in this situation the VisiNotify server will expose its proxy pull supplier objects as GIOP 1.0/1.1 objects. Therefore, because of requirements of the applicable OMG specifications, pull consumers are implicitly forced to pull events only using GIOP 1.0/1.1 Requests. This provides for the opportunity to use a GIOP 1.0/1.1 Reply with the process described above in scenario B used to adjust payload alignment. Although in this circumstance there is no restriction on the supplier application's GIOP version, a consequence is that the system may only expose its proxy pull supplier objects as GIOP 1.0/1.1 objects and may not able to take advantage of some of the features provided by GIOP 1.2.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

The invention claimed is:

1. A method for transmitting an event message from a first application to at least one second application over an event channel, the method comprising:
generating a message request based on an event at a first application, the message request having a header and a body, the body containing typed event data marshaled for transmission over an event channel; the message request comprises a General Inter-ORB Protocol (GIOP) Message Request
sending the message request to the event channel;
providing an indicator enabling a user to specify whether to adjust the header if necessary to properly align the body of an event message;
in response, reading the header to obtain information about the event without un-marshaling the body;
creating a wrapper based, at least in part, on the information obtained from the header;
appending the body to the wrapper to create an event message;

determining at least one second application to receive the event message;

determining if the body of the event message is properly aligned;

if the body of the event message is determined to be misaligned blocking delivery of the event message based on the indicator; and if the body of the event message is determined to be properly aligned delivering the event message to said at least one second application.

2. The method of claim 1, further comprising:

un-marshalling the body of the event message at the second application for processing the typed event data.

3. The method of claim 1, wherein the header of said GIOP Message Request includes an operation name.

4. The method of claim 1, wherein said step of creating a wrapper includes reading the header to obtain an operation name.

5. The method of claim 4, wherein said step of creating a wrapper includes inserting said operation name into the wrapper.

6. The method of claim 1, wherein said step of creating a wrapper includes creating a wrapper for each said at least one second application registered with the event channel to receive the event message.

7. The method of claim 6, wherein said step of creating a wrapper includes inserting an address of each said at least one second application into the wrapper.

8. The method of claim 1, wherein said appending step includes appending the body to the wrapper without un-marshaling the body.

9. The method of claim 1, wherein said appending step includes appending the body to the wrapper without re-marshaling the body.

10. The method of claim 1, further comprising:

retaining a copy of the body;

un-marshaling at least a portion of the body for filtering purposes;

applying a filter to the un-marshaled portion of the body for determining at least one second application to receive an event message based on the message request; and appending the copy of the body to the wrapper to create an event message for delivery to said at least one second application.

11. The method of claim 1, further comprising:

storing a copy of the body of the message request.

12. The method of claim 1, wherein said determining step includes determining at least one second application registered with the event channel to receive the event message.

13. The method of claim 1, wherein said appending step further comprises:

adjusting the wrapper length if necessary for proper alignment of the body.

14. The method of claim 1, wherein said appending step further comprises:

if the body is determined to be misaligned and the indicator does not specify that misaligned messages are to be blocked, adjusting the wrapper length to provide for proper alignment of the body.

15. A computer-readable medium having processor-executable instructions for performing the method of claim 1.

16. The method of claim 1, further comprising:

providing a downloadable set of processor-executable instructions for performing the method of claim 1.

17. A method for delivering a message based on an event at a supplier object to a consumer object through a communication channel, the method comprising:

receiving at a communication channel a request from a supplier object based on an event, the request is a General Inter-ORB Protocol (GIOP) Message and including a request header and a payload, the payload comprising typed event data based on the event marshaled for delivery through the communication channel;

identifying a consumer object to receive a message based on the request;

generating a message header based, at least in part, on the request header;

creating a message for delivery to the consumer object by appending the payload to the message header, the message created without un-marshalling the payload;

providing an indicator enabling a user to specify whether to adjust the message header if necessary to properly align the payload;

determining if the payload of the message is properly aligned;

if the payload is determined to be misaligned blocking delivery of the message based on the indicator; and if the payload of the message is determined to be properly aligned, delivering the message to the consumer object.

18. The method of claim 17, wherein the request header of said GIOP Message Request includes an operation name.

19. The method of claim 17, wherein said generating step includes extracting an operation name from the request header.

20. The method of claim 19, wherein said generating step includes inserting said operation name into the message header.

21. The method of claim 17, wherein said generating step includes inserting an address of the consumer object into the message header.

22. The method of claim 17, further comprising:

storing a copy of the payload to protect against loss of the payload.

23. The method of claim 17, further comprising:

if said determining step determines that the payload is misaligned and the message is not blocked based on the indicator, adjusting the message header length to properly align the payload.

24. The method of claim 17, further comprising:

if said determining step determines that the payload is misaligned, notifying the supplier object of an error condition.

25. The method of claim 17, further comprising:

if said determining step determines that the payload is misaligned, adjusting the message length if said indicator specifies that the message header is to be adjusted.

26. The method of claim 17, wherein said determining step is based, at least in part, upon determining a General Inter-ORB Protocol (GIOP) version used by the consumer object.

27. The method of claim 17, wherein said determining step is based, at least in part, upon determining a General Inter-ORB Protocol (GIOP) version used by the supplier object.

28. A computer-readable medium having processor-executable instructions for performing the method of claim 17.

29. The method of claim 17, further comprising:

providing a downloadable set of processor-executable instructions for performing the method of claim 17.

30. An apparatus comprising: a processor for executing instruction to send an event message from a supplier program to a consumer program, the system comprising:
- a supplier object request broker for receiving notice of an event at a supplier program, creating a message request based on the event, the message request comprises a General Inter-ORB Protocol (GIOP) Message Request and transmitting the message request to an event channel, the message request including a header and a body containing typed event data marshaled for transmission through the event channel;
- an indicator enabling a user to specify whether to adjust the message header if necessary to properly align the body of a message;
- an event channel for receiving the message request, reading the header to obtain information about the event, creating a wrapper based on the information from the header, appending the body to the wrapper to create a message without un-marshalling the body, determining a consumer program to receive the message, and delivering the message to a consumer object request broker associated with the consumer program; wherein the event channel determines whether the body of the message is properly aligned and blocks delivery of the message to the consumer object request broker based on the indicator if the message is determined to be misaligned; and
- a consumer object request broker for receiving the message from the event channel, un-marshaling the body of the message to obtain the typed event data, and providing the typed event data to the consumer program.

31. The system of claim 30, wherein said event channel operates at the object request broker level.

32. The system of claim 26, wherein the header of said GIOP Message Request includes an operation name.

33. The system of claim 32, wherein said event channel inserts the operation name from the request header into the wrapper.

34. The system of claim 30, wherein said event channel inserts an address of the consumer object request broker into the wrapper.

35. The system of claim 30, further comprising:
- a database for storing a copy of the body received by the event channel.

36. The system of claim 30, wherein said event channel adjusts the wrapper length if said event channel determines the body of the message is misaligned and the indicator allows delivery of the message.

37. The system of claim 30, wherein said event channel notifies the supplier object request broker of an error if the body of the message is misaligned.

38. The system of claim 30, wherein said event channel receives a reply message from the consumer object request broker and returns the reply message to the supplier program through the supplier object request broker.

39. The system of claim 30, wherein said supplier object request broker sends the message request to the event channel in response to an event-pulling message sent by the consumer object request broker.

* * * * *